INVENTORS
JOHN J. MELBAR
JAMES A. PLAS

JEFFERS & YOUNG
ATTORNEYS

INVENTORS
JOHN J. MELBAR
JAMES A. PLAS
BY
JEFFERS & YOUNG
ATTORNEYS

Dec. 23, 1969  J. J. MELBAR ET AL  3,485,506
VEHICLE STEERING APPARATUS
Filed March 6, 1967  7 Sheets-Sheet 3

INVENTORS
JOHN J. MELBAR
BY JAMES A. PLAS

JEFFERS & YOUNG
ATTORNEYS

Dec. 23, 1969   J. J. MELBAR ET AL   3,485,506
VEHICLE STEERING APPARATUS
Filed March 6, 1967   7 Sheets-Sheet 4

INVENTORS
JOHN J. MELBAR
JAMES A. PLAS
BY
JEFFERS & YOUNG
ATTORNEYS

Dec. 23, 1969  J. J. MELBAR ET AL  3,485,506
VEHICLE STEERING APPARATUS
Filed March 6, 1967  7 Sheets-Sheet 5

INVENTORS
JOHN J. MELBAR
BY JAMES A. PLAS
JEFFERS & YOUNG
ATTORNEYS

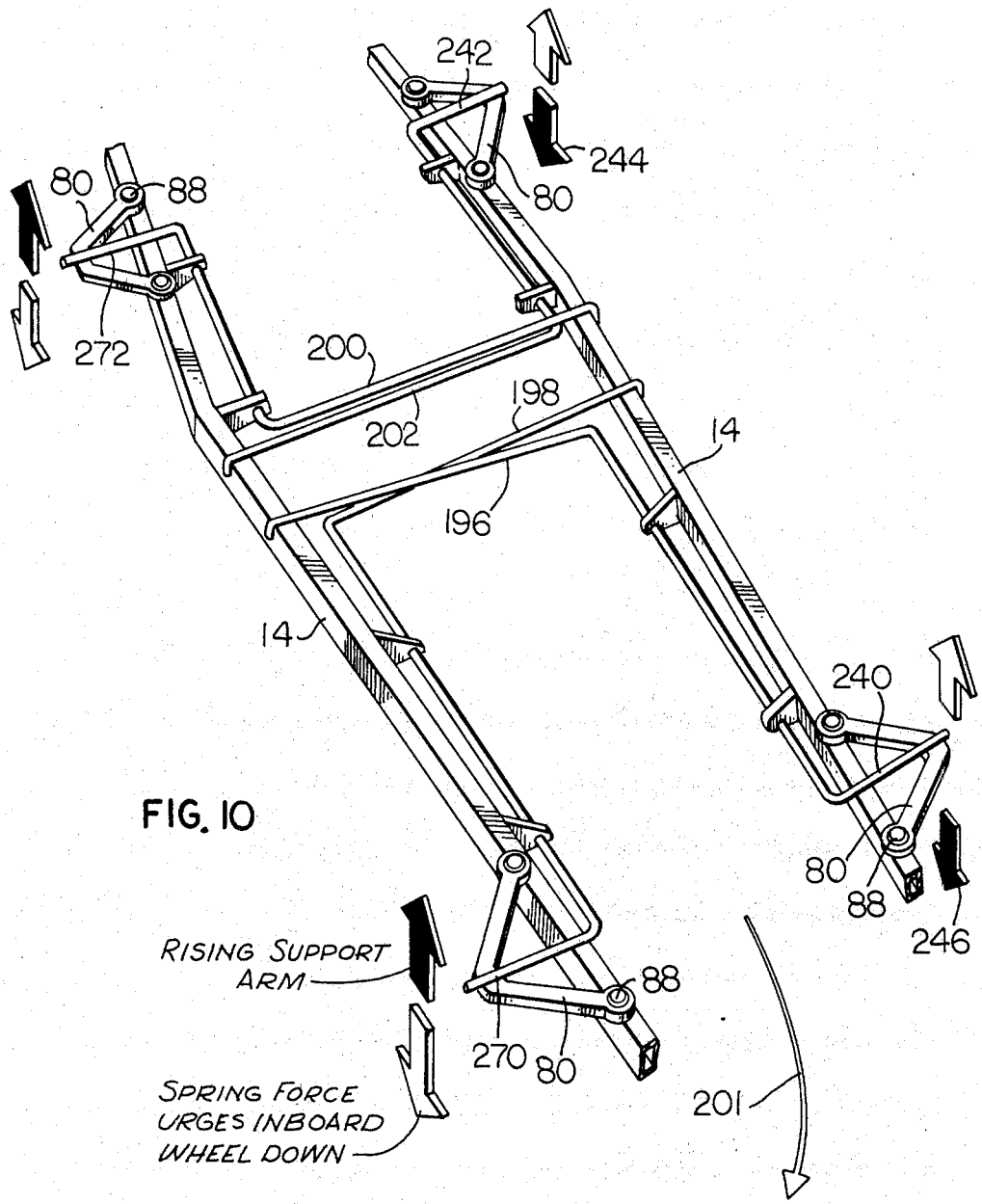

United States Patent Office 3,485,506
Patented Dec. 23, 1969

3,485,506
VEHICLE STEERING APPARATUS
John J. Melbar, 530 Lakeside Ave., Lorain, Ohio
44052, and James A. Plas, 365 Indian Hollow
Road, Elyria, Ohio 44035
Filed Mar. 6, 1967, Ser. No. 621,057
Int. Cl. B62d 9/00, 7/06
U.S. Cl. 280—87      10 Claims

ABSTRACT OF THE DISCLOSURE

A steering apparatus for vehicle wheels in which the king pin and steering knuckle are floatably mounted by support arms which are pivotally connected to the frame and to the opposite ends of the king pin respectively. Steering is effected by turning the wheel and moving the support arms in unison with steering effort on the wheel so that the wheel is both angularly banked and steered by simultaneous and coordinated operations.

---

This invention relates to an improved vehicle steering apparatus, and more particularly, to a novel combination of chassis and wheel-support means by which the vehicle is made more stabilized when changing direction of movement. Thus, when the vehicle is cornering, changing lanes or otherwise steered in a changing direction, the vehicle is more closely controlled and is more manueverable by reason of the improved steering in accordance with the present invention.

In present vehicles, when the driver intends to change the direction of motion of the vehicle, the steering wheels are turned and this causes the vehicle to follow a new course; however, when the wheels are so turned through too sharp an angle in relation to the center of gravity and speed of the vehicle, the vehicle will tend to drift and it becomes difficult to control. As a result, the steering is indefinite, and wear, particularly on the tires and chassis, tends to be excessive, and there is considerable strain put on the vehicle structure. Other consequences of this imbalance of inertia forces can result, including skidding of the vehicle, leading to accidents of various sorts.

In accordance with the present invention, it is proposed that the vehicle be made more stable by providing that both the chassis and the wheels are tiltable in accordance with the direction and degree of turning. Thus, as the vehicle is turned through an angle, both the chassis and the wheels are banked or inclined by an amount which shifts the center of gravity and makes the vehicle more stable in the turn. The present invention provides that the degree of tilting of the chassis and wheels is related to the degree of turning so that when a shift of the center of gravity is needed, the amount of shift is in accordance with the steepness of the turn. The adjustable tilting of the chassis and wheels is done automatically and in the correct amounts, so that the driver need not be conscious of utilizing this compensation to effect stabilized steering of the vehicle.

It is a principal object of the present invention to provide an inexpensive chassis mounting which automatically disposes the chassis at a bank angle appropriate to the degree of turning of the vehicle, thereby producing a more easily controlled and stable vehicle during steering in direction change of the vehicle.

A further object of the present invention, is to produce a novel operating structure for a chassis and wheel-support which are coordinately positioned in that they both undergo a degree of bank in accordance with the amount of turning or change-direction of the vehicle so that the vehicle can more readily undertake such change in direction.

Another object of the present invention is to provide a novel two-part chassis frame, one of which supports the motor and transmission, and the other of which supports the driver and is pivotally mounted on the one frame section for angular movement thereon.

An important feature of the invention is that the movable frame section has attached operatively to it the king pin on which the wheels are mounted both for steering and for inclination movements; that is, they are adapted to bank as well as turn. In this way, the wheels and chassis move coordinately during a vehicle turn.

It is a still further object of the present invention, to coordinate the banking movements of the chassis and tires with the steering effort of the operator so that both the wheels and chassis are adjusted angularly in exact accordance with the degree of turning of the vehicle wheel. Consequently, the driver has a sure feel of the vehicle and he is able to make it track more exactly and is less likely to have the vehicle go out of control by spinning, rolling, etc.

Another important feature of the present invention, is that because the vehicle is more controllable, the amount of road noise is reduced and the wear on the vehicle parts, especially the tires, is reduced because skidding of the vehicle is greatly diminished. Not only is the vehicle prevented from uncontrollable sliding, but the driver has a sure, accurate sense of the turn. Consequently, the driver has an easier vehicle to steer, by reason of its dynamic balance, giving him a more accurate "feel" for the turn and the vehicle is far more responsive in the turn. As a result, vehicle safety standards are greatly increased and the vehicle is more likely to avoid dangerous skids and rolls.

Another important feature of the invention is the suspension system for the vehicle which utilizes a novel resilient means in combination with each vehicle wheel and is adapted to load the inboard set of wheels during a turn so that the vehicle is more stabilized and achieves more uniform loading of the inboard and outboard set of wheels.

The foregoing, and additional objects and features of the invention, will become apparent from a consideration of the following description, which proceeds with reference to the accompanying drawings, wherein;

FIGURE 10 is an isometric detail view of one of the frame members and a plurality of torsion springs, one associated with each of the mounting members for the king pin axis and arranged so that the inboard set of wheels going around a turn are loaded in a manner equalizing the load on all the wheels.

Figure 1:
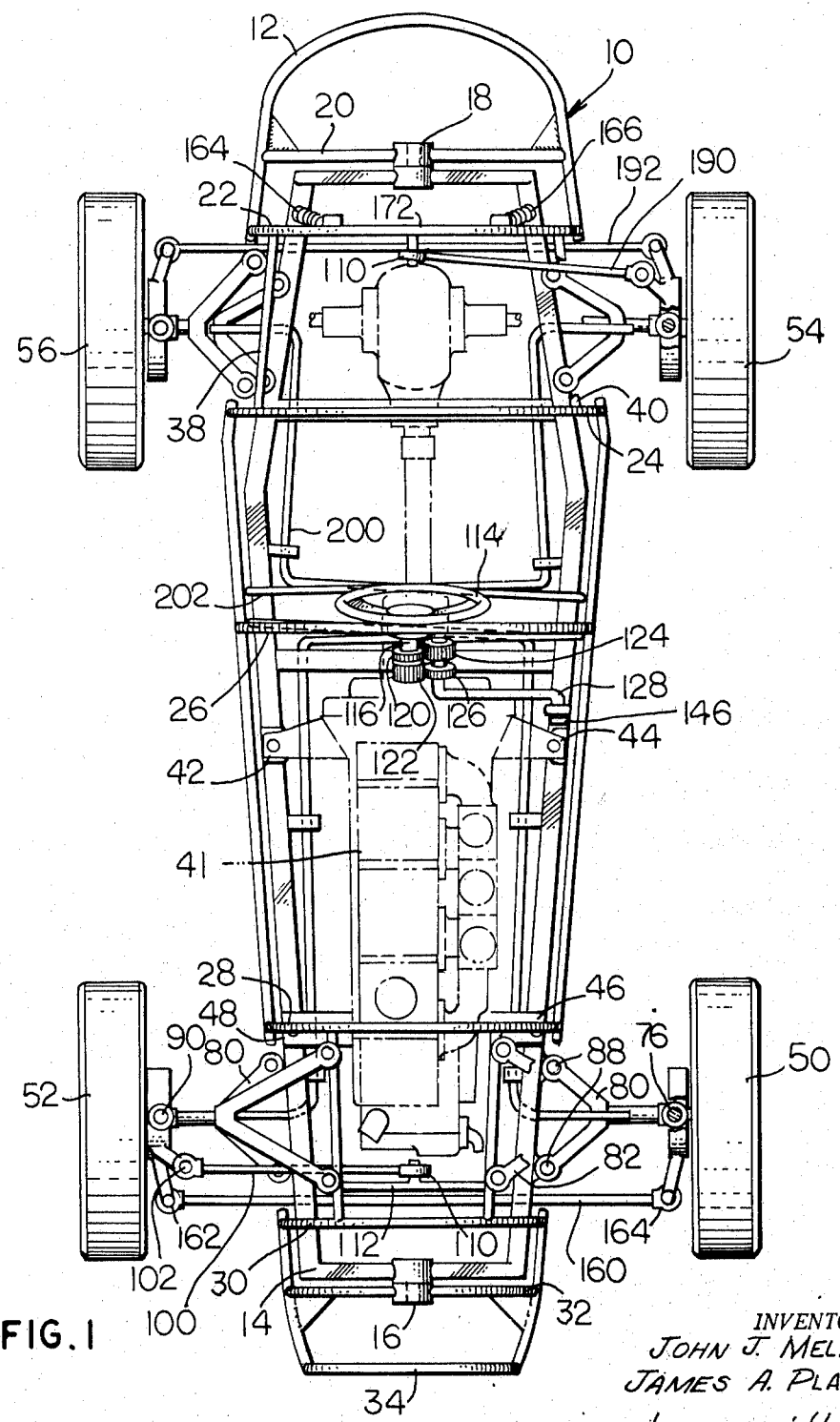
FIGURE 1 is a top view of a vehicle incorporating the present invention therein.

Referring now to the drawings, and particularly to FIGURE 1, a chassis designated generally by reference numeral 10 consists of an outer frame 12 which is mounted for pivotal movement on a relatively fixed inner frame 14 by means of pivot members 16 and 18 at the front and rear respectively of the vehicle. Outer frame 12 consists of tubular bar stock or other suitable structural members running lengthwise of the vehicle and defining the general outline of the vehicle. The outer frame 12 includes cross members 20, 22, 24, 26, 28, 30, 32 and 34, the cross members 24 and 26 being spaced apart sufficiently to define the driver compartment. The cross member 24 may be suitably reinforced with cross member 22 by strengthening tie bars 38 and 40, to provide added protection to the driver. The inner frame 14 also serves as a support for the motor which is shown in general outline by reference numeral 41, there being a plurality of mounting flanges 42, 44, 46 and 48 which serve to transfer the weight of the motor onto the inner frame. It should be understood that the inner frame 14 serves to support the vehicle weight including the motor, differential, but will nevertheless permit pivoting at the opposite pivot pins 16 and 18 of the outer frame 12. As pivoting occurs, the center of gravity of the vehicle is shifted laterally i.e., from one side of the vehicle to the other in order to stabilize the vehicle against objectionable inertial effects during a change in direction of the vehicle which is brought about by steering.

Figure 2:
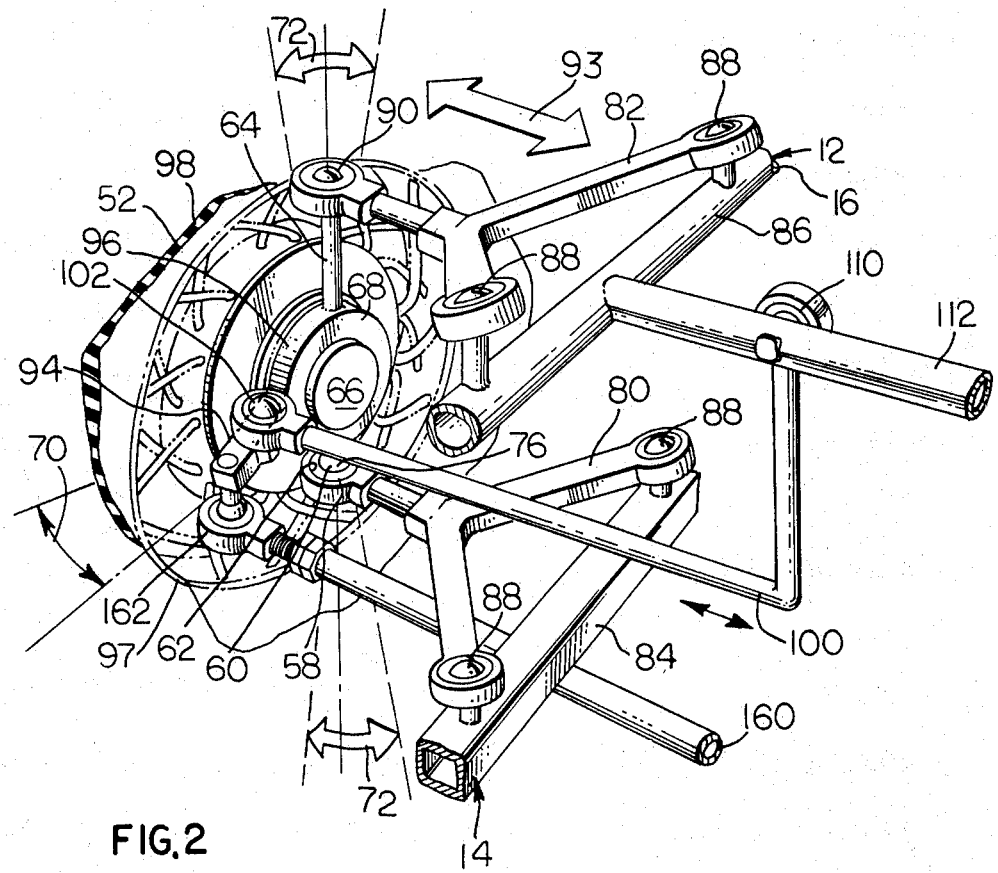
FIGURE 2 is an enlarged isometric detail view of the suspension and steering system associated with the right front wheel.
Figure 3:
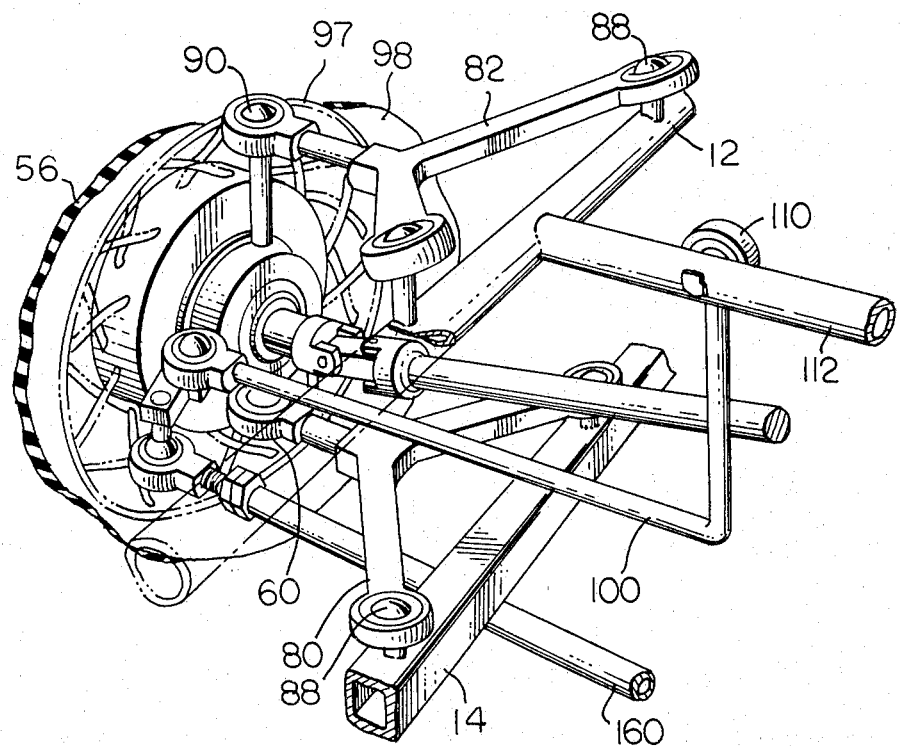
FIGURE 3 is an isometric detail view of the steering and suspension system associated with the right rear wheel.
Figure 9:
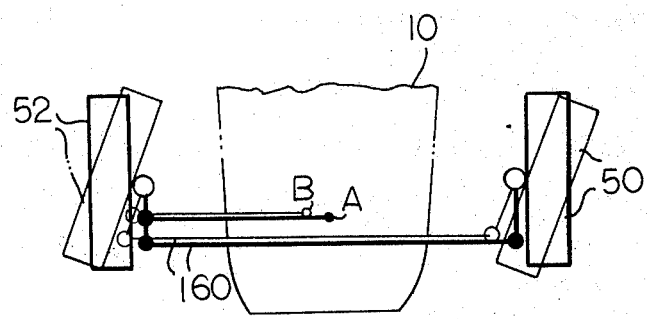
FIGURE 9 is a schematic view showing how the vehicle wheels are steered.

Each of the vehicle wheels including the front wheels 50, 52 and rear wheels 54 and 56, are mounted on respective steering knuckles, the front wheels 50, 52, being mounted one on each of steering knuckles 58, in the manner shown in FIGURE 2, the rear wheels being mounted one on each of steering knuckles 60, in the manner shown in FIGURE 3.

Referring to FIGURE 2, the steering knuckle 58 has a ball 60 and a socket 62 portion permitting the king pin 64 which supports the wheel through axle 66 and hub 68 to turn through steering angles as indicated by the arrow 70. The king pin 64 is also movable angularly in a vertical plane as indicated by the arrow 72, so that the wheel can bank angularly, this effect being had by a rocking of the king pin 64 about its lower end 76 on the steering knuckle. This described rocking effect can also be seen by referring to FIGURE 8 which shows, schematically, from a front view of the vehicle, that the vehicle tires can bank angularly from a true vertical position thus permitting a shift of the center of gravity of the vehicle when the one frame section (the upper part) is pivoted to the right or to the left of the lower frame section which is fixed.

Inclining of the wheel in the direction of the arrow 72, is permitted by reason of the two vertically spaced mounting arms 80, 82, the lower arm 80 being connected to a frame member 84 of the relatively fixed inner frame 14 and the upper mounting arm 82 being mounted on a frame member 86 of the outer frame 12 which is movable in a pivotal sense on the inner frame 14. Each of the mounting arms has spaced ball-socket universal mounting connections 88, with its respective frame members 84, 86, with the upper arm 82 being connected through a ball-socket connection 90 with the upper end of the king pin 64, and the lower arm 80 being connected to the opposite end of the king pin 64 through ball 60 and socket 62 connection. In this way, the king pin 64 can incline from its upright position in the directions of the arrows 72 as the pivotal frame 12 moves outwardly or inwardly in the directions indicated by the arrows 93. The described movement is permitted by the ball-socket connections of the mounting members 80, 82 with the frames 12 and 14 and the ball-socket connections with the opposite respective ends of the king pin 64. The wheel can also move, as a whole, vertically upwardly and downwardly as well as inclining outwardly in the direction of the upper arrow 72; all of these composite movements are permitted concurrently with various steering angles of the wheel about the steering knuckle in the direction of the arrow 70 or in a direction opposite that of arrow 70.

Steering is effected on the knuckle through a steering arm 94 (FIGURE 2) connected through a collar 96 to axle 66 on which is rotatably mounted the wheel and tire 98, and steering movement is imparted to the steering arm 94 by means of a drag link 100 connected at one end through a ball socket 102 to steering arm 94 and at the opposite end through a second ball-and-socket 110 to frame member 112 of pivotal outer frame 12.

Figure 6:
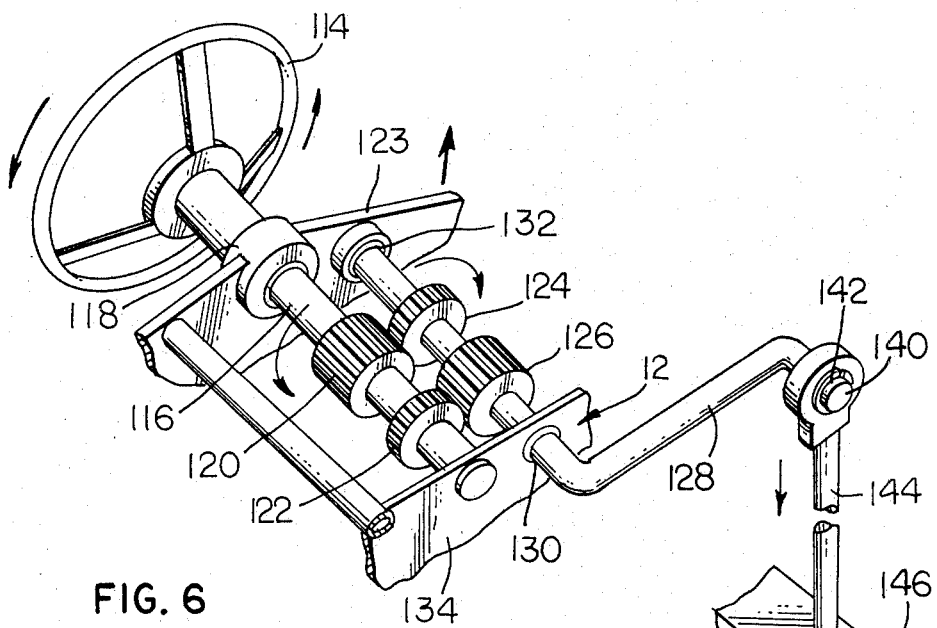
FIGURE 6 is an isometric detail view of the steering.

Steering of the wheels is obtained by means of a manual steering wheel 114 (FIGURES 1, 6) having a steering column 116 passing through a sleeve bearing 118 mounted in dashboard 123 and having two spaced steering gears 120 and 122 meshing with transfer gears 124 and 126 on steering linkage 128 which is passed through aligned mounting openings 130 and 132, the opening 130 being formed in plate 134, and opening 132 being in the dashboard 123. The steering linkage 128 has a crank end 140 with a ball-socket articulated connection 142 with a torque reaction arm 144 which is hingedly connected at 146 with a frame member 148 of the relatively fixed inner frame 14, so that the steering torque developed by turning the wheel has a fixed torque reaction connection with the fixed inner frame 14 and turning force is effected to produce a pivotal movement of the entire pivoted frame 12 acting through the steering gears 120, 122 and transfer gears 124, 126 on the pivotal frame 12 causing it to turn about its pivotal connections 16, 18, at the opposite ends of the fixed inner frame 14. The steering wheel 114 determines both the direction and the degree of turning of the outer frame 12 and such turning (FIGURE 2) urges the drag link 100, (connected to frame member 112) to the right or to the left, turning the right front wheel through the steering arm 94 about the steering knuckle 58 on the lower mounting arm 80; the left front wheel is similarly turned, since the two steering arms of both front wheels are connected together through a tie rod 160 having ball-socket connections 162 and 164 (FIGURE 1) with the respective steering arms.

Figure 7:
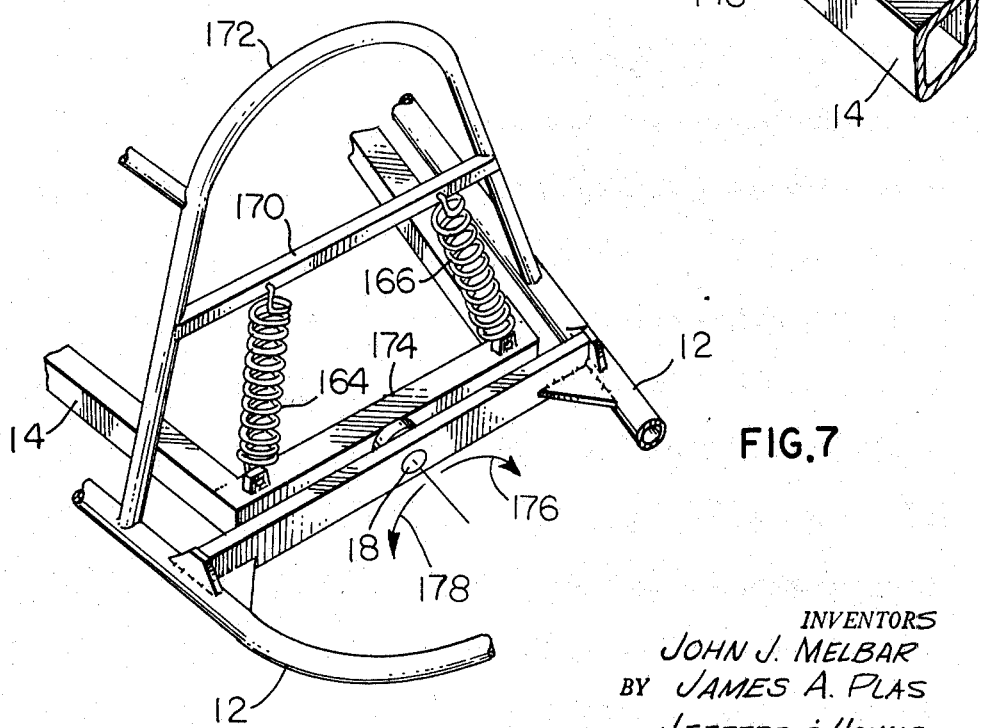
FIGURE 7 is an enlarged isometric detail view of the resilient means for restoring the chassis and wheels to a straight-ahead position when the steering effort effecting a turn is relieved.

Referring to FIGURE 7, the relatively movable outer frame 12 has operatively attached to it two springs 164 and 166, one on each side of the pivot connection 18 and connected at one end thereof to a frame section 170 secured to upright frame section 172 of the outer movable frame 12, the other ends of the springs being secured to a frame section 174 of the relatively fixed frame 14, so that one or the other of the springs 164, 166 is stretched depending upon the direction of angular movement of the movable frame 12 about pivot 18 in the direction of arrow 176 or 178. Thus, one or the other of the springs 164, 166, provides a restoring force, tending to return the movable frame 12 to a normal position when the steering effort on steering wheel 114 is relieved. Consequently, it takes some manual input effort to produce the initial turning and to hold the steered position. The springs 164, 166 provides a "feel" for the operator by which he can tell from the degree of input effort how much steering effect is produced.

Figure 8:
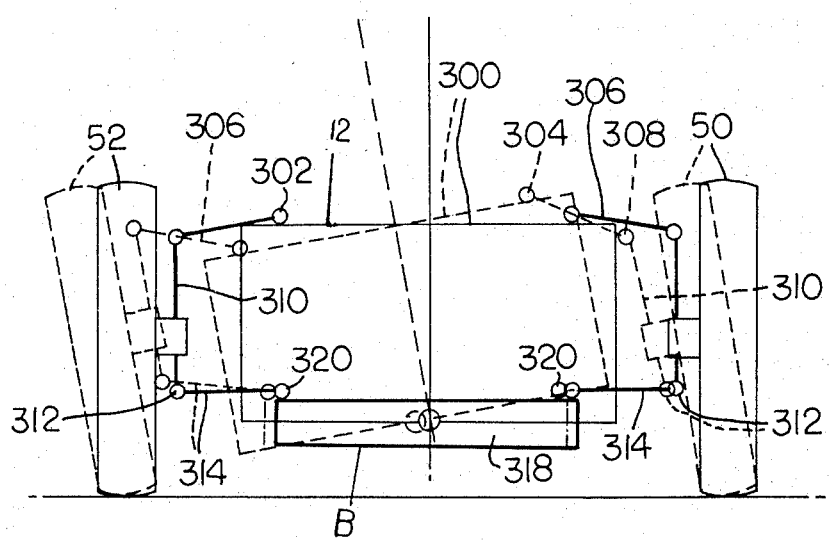
FIGURE 8 is a schematic view showing the articulated linkage of the chassis and king pin axis for tilting the wheel and chassis.

From the description, it will be seen that the degree of steering of the wheels is determined by the angular movement of the frame, and since the angular movement of the frame and its contents produces a shift in the center of gravity, such shift being directly related to the steering angle of the wheels the vehicle is thusly stabilized. Schematically, this described result is shown in FIGURE 8. The pivotal outer frame 12 is designated by the rectangular box frame 300 having upper articulated linkages 302, 304 with support arms 306 which in turn have articulated outer connections 308 with the king pin 310, the lower end of which is mounted in a steering knuckle 312 secured through a lower support arm 314 to a fixed frame member 318 through articulated connections 320 to the frame B. Outer frame 12 causes the upper support arm 306 to tilt from its vertical position about the steering knuckle, thereby causing the steered wheel to move from a vertical position to a "banked" position. Also the lower arm 314 is raised or lowered depending upon the direction of turning, this result being inherent in the geometry of the system.

The schematic illustrates these features of the invention: (1) by moving one frame section relatively to another frame section, the center of gravity of a vehicle can be shifted and in coordination therewith the wheels of the vehicle can be banked by the correct amount appropriate to the degree of steering so that the vehicle will be less prone to skidding about the turn, (2) the steering angle of the wheels is determined by the degree of angular movement of the frame and such steering is produced without interruption or interference to the other functions of the system as for example, the vertical shock support provided by the mounting levers and associated springs.

The present invention, instead of providing an axle mounting for the wheels, provides that the wheel is mounted on a king pin which is swivably mounted on the steering knuckle so that concurrently with turning of the wheel about the longitudinal axis of the king pin, the king pin will be caused to incline outwardly or inwardly on the steering knuckle to give the wheel both vertical inclination and angular turning which produces both bank and turn. This result can be used independently or in combination with two frame sections, which two sections can move with respect to each other and be tied directly into the steering system.

During steering, the rear wheels of a vehicle tend to track differently from the front wheels. It is a common experience of a driver to note that in making a turn, while the front of the vehicle responds accurately and satisfactorily to steering, the rear of the vehicle tends to drift because the rear wheels tend to continue in a straight-ahead motion and do not follow the radius of turning of the front wheels. In the present invention, however, the rear wheels are also both banked and turned (FIGURE 5) in a direction opposite that of the front wheels because the rear wheels are mounted on king pins which are supported on upper and lower support arms respectively connected to the fixed and movable frames, the same as the front wheels. This arrangement permits the rear wheels to move angularly and to incline in a bank the same as the front wheels. However, the rear wheels are steered in an opposite angular sense from the front wheels since the left rear wheel is connected by a drag link 190 to the movable frame and the two rear wheels are connected by a tie rod 192 so that the degree of turning of the rear wheels is the same as the front wheels, but in a direction opposite to that of the front wheels.

Figure 5:
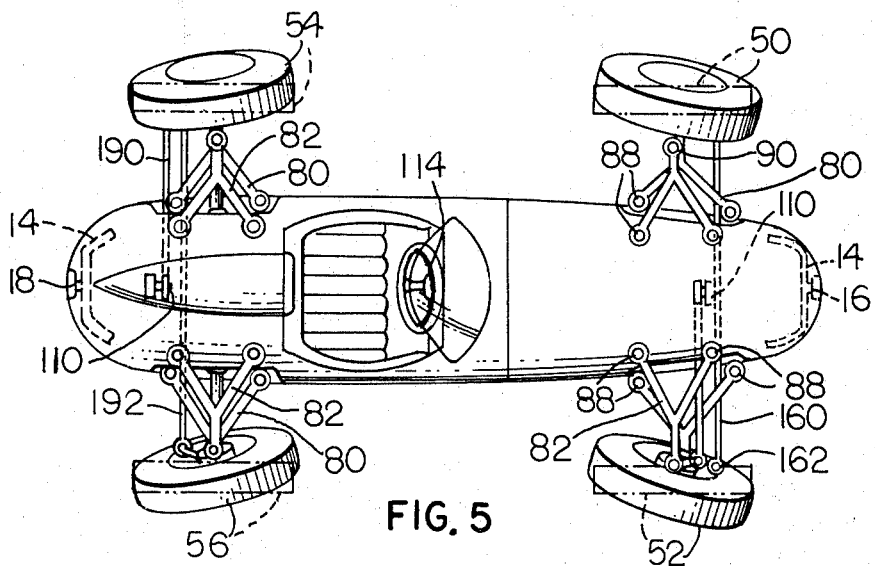
FIGURE 5 is a top view of the vehicle with the wheels and chassis in a steered position shown in FIGURE 4, the dotted line position showing the parts of the vehicle in the straight-ahead position of the vehicle.
Figure 4:
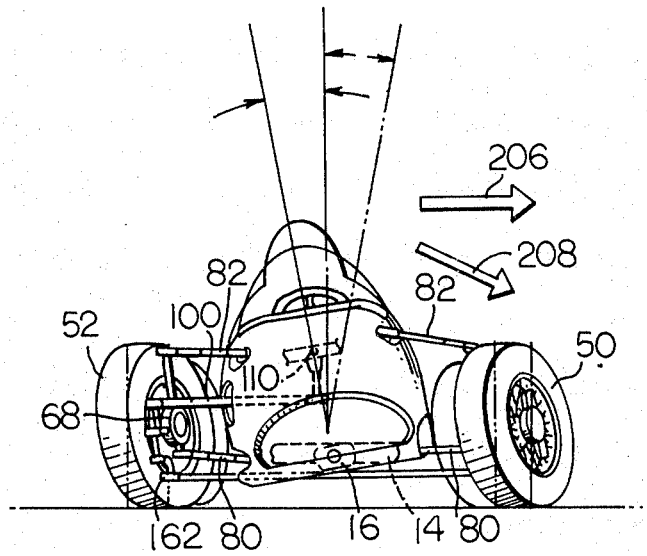
FIGURE 4 is a front view of the vehicle showing the banked position of the chassis and wheels with the vehicle making a right hand turn.

Referring to FIGURE 5, the composite effect of steering the front and rear wheels is that the front and rear wheels are disposed at a steering angle such that the left front and left rear wheels are located at substantially the same steering radius and the right front and right rear wheels are also on the same steering radius. The wheels are also respectively disposed at a correct bank and the chassis has shifted (FIGURE 4) so that its center of gravity is moved toward the center of steering movement of the vehicle. Thus the front and rear of the vehicle tend to move along coordinate paths and the vehicle is stabilized in the turn and its center of gravity shifted appropriately so that there is less likelihood of skidding or other uncontrollable effects of turning. The driver has the vehicle more under control and is better able to sense the vehicle movement and produce the desired vehicle motion. Also as a result, much steeper turns are permitted with less likelihood of skidding, road noise, damage to the tires, etc., than is the case with conventional steering arrangements.

As the vehicle tends to move in the direction of arrow 201, the movable frame 12 will tend to pivot toward the center of turning and as it does so, the support arms 80 and 82, on the inboard side of the fixed frame 14 will tend to move upwardly. As the support arms 80, 82 on the inboard side of the vehicle are raised, (FIGURES 4, 10) the support arms 80 and 82 on the outboard set of wheels (the right front and rear wheels) will tend to move downwardly.

Torsion spring 198 and torsion spring 200 have spring arms 270, 272, which act against lower arms 80 associated with the inboard front and rear wheels tending to force them downwardly in the direction of the white arrows having the legend "SPRING FORCE URGES INBOARD WHEEL DOWN," FIGURE 10. The torsion springs tend to load the inboard set of wheels in order to equalize the inertial load indicated by arrow 206 (FIGURE 4) which produces a component of inertial force indicated by arrow 208 tending to load the outboard set of wheels to a greater extent than the inboard set of wheels.

By virtue of this torsion spring arrangement acting against the support arm which tends to raise during the turn and effect greater loading of the inboard set of wheels, the four wheels are loaded in a manner tending to equalize the load on all the wheels. Because of this described equalization of loading, the vehicle is more controllable. This can be understood from the common tendency of a vehicle to tend to tip outwardly as it goes around the turn with a substantial weight transferred to the outboard set of wheels, only one of which is steerable, and tending to produce an uncontrollable vehicle skid. When the weight is more evenly distributed however, between the inboard and outboard set of wheels, the vehicle can be steered more accurately and is less prone to skid and swerve. Consequently, turns can be negotiated more easily at higher speeds; or, conversely, at the same speed the vehicle can more easily negotiate a curve without drift or skid and this result applies notwithstanding roadway conditions being icy, wet or containing loose material.

The same described result applies, when the vehicle is turning in a direction opposite that indicated by the arrow 201, in which case, the front left and rear left wheels are loaded downwardly, being the inboard set of wheels as the vehicle turns in the direction opposite that of arrow 201 (FIGURE 10) and the load is relieved on the front right and rear right wheels. It should be noted, that the new and improved suspension system which provides the described results, is, to an extent, separate from and may be provided independently of the improved steering mechanism. That is, the novel spring loading arrangement on the inboard set of wheels, causing them to bear downwardly into ground engagement with a greater force in order to equalize the loading on all of the wheels as the vehicle makes a turn, may be utilized in conjunction with or independently of the novel steering system previously described.

In operation, when the vehicle steering wheel 114 is turned, the steering column shaft 116 is likewise turned, causing the steering gears 120, 122 to rotate and producing a counter-rotation of the transfer gears 124, 126. The steering linkage 128 is connected to the relatively fixed torque reaction steering linkage 144 connected to the fixed frame 14 and produces a tilting movement of the outer frame 12 which is pivotally supported at its opposite ends on pivot pins 16, 18, fixed to the inner frame 146. As the frame 12 moves pivotally, the upper support arms 82, which are associated with the respective wheels tilt the king pins 64 either outwardly or inwardly (depending upon their location on the vehicle) about their respective steering knuckles. At the same time, the drag link 100 associated with the front right wheel and the drag link 190 associated with the left rear wheel cause the front left wheel and the right rear wheel to move on the steering angle which is proportional to the degree of rocking of the pivotal frame about the fixed frame. The two front wheels, being connected by a tie rod 160 and the two rear wheels, being connected by tie rod 192 are turned through the same degree of angular movement. It should be noted that the wheels are not only turned, but are banked appropriately to the degree of rocking movement effected on the pivotal frame and thus, the steering produced by the input effort of the steering wheel produces a four-fold effect of: (1) shifting the center of gravity of the vehicle frame, (2) banking the wheel, (3) effecting a turning angle on the wheel, (4) stiffening the support for the inboard wheels. Moreover, the front wheels are moved by the same amount and the rear wheels are moved by the same amount, but oppositely turned relative to the front wheels.

When the steering effort is relieved, the torsion springs associated with the inboard wheels and one or the other of the springs 164, 166 (FIGURE 7) which has been stretched by turning of the rockable frame 12, will restore the frame 12 to a neutral position and as the frame returns to a neutral position the wheels will be restored to a vertical straight-ahead position. Thus, the driver must continue to exert effort to maintain the turn and the springs will provide a counterreaction to the steering effect so that the driver obtains a "feel" of the degree of turning. The greater the degree of turning, the driver must exert a proportional effort in relation to the degree of turning. This contributes to the accuracy of turning, being an added measure of controllability so that the vehicle is under the surer guidance of the driver. Because the driver need not exert any effort to get the wheels to restore to a tracking or straight ahead position, the vehicle is more convenient to steer and is more similar in reaction to a conventional steering system, which tends to restore the wheels to a straight tracking ahead position when the steering effort is relieved.

Another important feature of the present invention is that as the vehicle is being turned, the inboard suspension system for the wheels is stiffened compensating for the inertial loading on the chassis and will more evenly distribute the load on the wheels. For example, referring to FIGURES 4 and 10, the suspension system on the right front and right rear wheels is stiffened by reason of the tilting of the rockable frame which loads the torsion springs, causing the ends thereof to bear downwardly on the support arms 80, whereby the wheels are biased downwardly by the suspension system. Conversely, should the vehicle be turning in a direction opposite that shown in FIGURE 4, rocking of the frame 12 in the opposite direction will load torsion springs causing the ends thereof to bear against support arms 80 on the left front and left rear wheels thereby stiffening the suspension for the wheels and equalizing the loads on the respective wheels.

Although the present invention has been illustrated and described in connection with a few selected example embodiments, it will be understood that these are illustrative of the invention and are by no means restrictive thereof. It is reasonably to be expected that those skilled in this art can make numerous revisions and adaptations of the invention to suit individual design requirements.

What is claimed is:

1. In a vehicle, a steering apparatus for effecting a combination of wheel turning and wheel inclination from a vertical plane, comprising relatively movable first and second frame portions, a king pin having articulated connections operatively secured one to each of said first and second frame portions, whereby a vehicle wheel supported by said king pin is moved through inclined positions relatively to a vertical plane, and means for effecting turning of said wheel by operative connection with one or the other of said frame portions whereby relative movement of said frame portion is translated to angular turning of said wheel in coordination with the inclination of the wheel from its vertical position.

2. The steering apparatus in accordance with claim 1 including steering means for effecting relative turning of said frame sections relatively to each other.

3. The steering apparatus in accordance with claim 1 including resilient means for urging said frame sections to a normal position wherein said wheel is positioned in a straight ahead-and-upright position.

4. A steering apparatus in accordance with claim 2 wherein said steering means includes a connecting rod operatively coupling the front vehicle wheels and the rear wheels respectively whereby each pair is turned in unison.

5. A steering apparatus in accordance with claim 1 including support means for pivotally suspending said king pin.

6. A wheel steering and mounting apparatus for vehicles having ground-supported wheels comprising a vehicle frame having relatively movable portions, two vertically spaced wheel support means each including a swivable connection to a respective one of said frame portions and an outwardly projecting arm having a swivable connection which forms the sole wheel mounting to said frame, a movable king pin suspended between the outwardly projecting arms of said support means and held vertically thereby through the swivable connection provided by said arms, a steering knuckle also supported solely by said arms and having a first and second couple arm movable in unison with said king pin through banked-and-steered positions and a steering member having a swivable connection with said steering knuckle and acting through said first and second couple arm which includes a portion of said steering knuckle to effect turning of said wheel and banking thereof from perpendicularity of said wheel on said support means.

7. The steering apparatus in accordance with claim 6 including means for coordinating the steering movements of two of said wheels.

8. The steering apparatus in accordance with claim 6 including cushioning support means for said wheel.

9. The steering apparatus in accordance with claim 8 including means for controlling the degree of resilience of said cushioning means.

10. The steering apparatus in accordance with claim 6 including means for resiliently loading the inboard set of wheels to effect more uniform loading of the wheels during turning.

References Cited

UNITED STATES PATENTS

| 2,029,735 | 2/1936 | Minott | 280—112 |
| 2,260,102 | 10/1941 | Freret | 280—87 X |
| 2,760,786 | 8/1956 | Kolbe | 280—112 |

FOREIGN PATENTS

| 426,120 | 10/1947 | Italy. |
| 1,063,473 | 8/1959 | Germany. |

KENNETH H. BETTS, Primary Examiner

U.S. Cl. X.R.

280—112